US006629846B2

(12) United States Patent
Poreh

(10) Patent No.: US 6,629,846 B2
(45) Date of Patent: Oct. 7, 2003

(54) METHOD FOR RECORDING PERFORMANCE IN PSYCHOLOGICAL TESTS

(76) Inventor: Michael Poreh, Einstein 28, Haifa (IL)

( * ) Notice: Subject to any disclaimer, the term of this patent is extended or adjusted under 35 U.S.C. 154(b) by 10 days.

(21) Appl. No.: 10/083,599

(22) Filed: Feb. 27, 2002

(65) Prior Publication Data

US 2003/0162156 A1 Aug. 28, 2003

(51) Int. Cl.[7] .............................................. G09B 19/00
(52) U.S. Cl. ...................................... 434/236; 434/238
(58) Field of Search ................................ 434/236, 237, 434/238

(56) References Cited

U.S. PATENT DOCUMENTS

| 4,375,080 | A | * | 2/1983 | Barry et al. ................. 434/238 |
| 6,030,226 | A | * | 2/2000 | Hersh ........................... 434/236 |
| 6,149,586 | A | * | 11/2000 | Elkind ......................... 600/300 |
| 6,491,525 | B1 | * | 12/2002 | Hersh ........................... 434/236 |

OTHER PUBLICATIONS

Waber, D.P.; Bernstein, J. H.; Merola, J. "Remembering the Rey–Osterrieth Complex Figure: A Dual–Code, Cognitive Neuropsychological Model" *Developmental Neuropsychology*, 1989.*

Goldstein, K. "After effects of brain injury in war". (1942) New York: Grune and Stratton.

Werner, H. "Process and achievement: A basic problem of education and developmental psychology" *Harvard Educational Review*, 1937, 7, 353–368.

Binder, L.M. "Constructional strategies on complex figure drawings after unilateral brain damage" *Journal of Clinical Neuropsychology*, 1982, 4, 51–88.

Rey, A. "L'examen psychologique dans les cas d'encephalopathie traumatique" *Archives de Psychologie*, 1941, 28, 286–340.

Visser, R.S.H. Manual of Complex Figure Test, (1973) Netherlands: Swets & Zeitlinger.

Bennet–Levy, J. "Determinants of performance on the Rey–Osterrieth Complex Figure Test: An analysis and a new technique for single case assessment" *British Journal of Clinical Psychology*, 1984, 23, 109–119.

Hamby, S. L.; Wilkins, J. W.; Barry, N. S. "Organizational quality on the Rey–Osterrieth and Taylor Complex Figure Tests: A new scoring system" *Psychological Assessment*, 1993, 5, 27–33.

Stern, R.A.; Singer E.A.; Duke, L.M.; Singer, N.G.; Morey, C.E.; Daughtrey, E.W.; Kaplan, E. "The Boston Qualitative Scoring System for the Rey–Osterrieth Complex Figure:Description and interrater reliability" *Clinical Neuropsychology*, 1995, 8, 309–322.

Bylsma, F. W.; Carison, M.C.; Schretlen, D.; Zonderman, A.; Resnick, S. "Rey–Osterrieth Complex Figure Test (CFT) Q–scores performance in 328 healthy adults ages 20 to 94" *Journal of International Neuropsychological Society*, 1997, 3, 70.

(List continued on next page.)

Primary Examiner—John Edmund Rovnak
(74) Attorney, Agent, or Firm—Mark M. Friedman

(57) ABSTRACT

A method for recording the process of an examinee performing a psychological test where the psychological test includes a finite number of elements that are to be sequentially manipulated. Such tests include memory tests or graphic manipulation tests such as copying complex figures. An observer uses a graphic input device, such as a touch-sensitive screen, to register and store the time each manipulation is performed. In such a way, the process is accurately recorded in an ecologically valid manner.

17 Claims, 9 Drawing Sheets

OTHER PUBLICATIONS

Troyer, A.K.; Wishart, H.A. "A comparison of qualitative scoring systems for the Rey–Osterrieth Complex Figure Test", *Clinical Neuropsychologist*, 1997, 11, 381–390.

Pope, H.S. Butcher, J.N. and Seelen, J. The MMPI, MMPI–2, MMPI–A in Court: A practical guide for expert witness and attorneys, 2d Ed. (2000) Washington, D.C.: American Psychological Press.

Poreh, A. "The Quantified Process Approach—An emerging approach to neuropsychological assessment" *The Clinical Neuropsychologist*, 2000, 14, 1–11.

Sbordone, R. J. and Long, C. J. Ecological Validity of Neuropsychological Testing (1996) Delray Beach, Florida: GR Press / St. Lucie Press.

Meyers, J.E.; Meyers, K.R. "Rey Complex figure under four different administration procedures" *The Clinical Neuropsychologist*, 1995, 9, 63–67.

Akshoomoff et al "The impact of early unilateral brain injury on perceptual organization and visual memory" *Neuropsychologia* 40 (2002) 539–561.

www.parinc.com/product,cfm?ProductID=264 BQSS Article.

* cited by examiner

1. SMILE
2. SNAKE
3. CAT
4. BEE
5. BAT
6. SUN
7. STAR
8. CLOUD
9. HAT

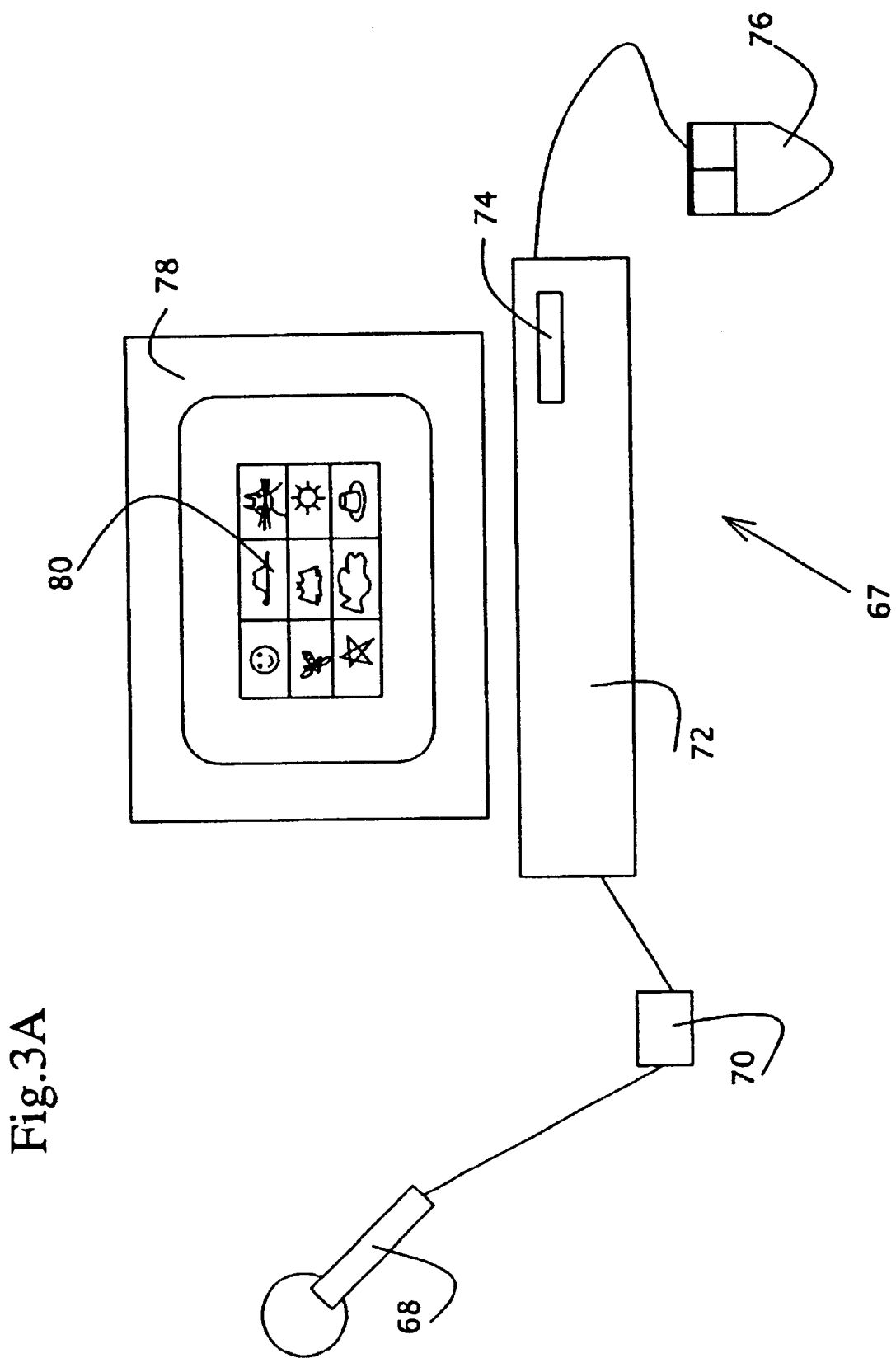

METHOD FOR RECORDING PERFORMANCE IN PSYCHOLOGICAL TESTS

FIELD AND BACKGROUND OF THE INVENTION

The present invention relates to the field of psychological evaluation and more particularly, to an improved method of recording the process by which an examinee performs a "multi-element" test.

It is often necessary to evaluate cognitive abilities of a person, such as memory, organization ability and intellectual capacity, or to identify cognitive skills that have been impaired, for example, by head injuries, neurological disorders, learning disabilities or psychiatric illnesses. To this end, various psychological tests have been developed.

In one common type of psychological tests, an examinee is asked to perform a task involving the manipulation of a finite plurality of elements. Such tasks include copying a complex geometric figure or design. Also included are tasks that include physical manipulation (relocating, assembling, reassembling) of objects with a finite number of elements, e.g. jigsaw puzzles. Also, there exist tests where the examinee is asked to reproduce, perform, recite or recall from memory a finite list of words or commands read by an examiner. For the purposes of succinctness, hereinfurther such tests shall be referred to as "multi-element tests".

In the art, evaluation of examine performance on multi-element tests is most often based on evaluating the end result of the test, that is, how accurately the examine was able to accomplish the entire test. However, it is known that the strategy that examinees use to accomplish a complex task is indicative of cognitive abilities and deficits, see references 1 and 2. For example, the order and rate by which children copy the elements of a complex figure has been shown to reflect planning ability and visual perception.

Methods have been developed for recording the process by which an examine performs a multi-element test, allowing subsequent evaluation of the process itself. The recording methods described in the prior art include a variety of techniques for manually recording an observed process using "pencil and paper" methods Direct manual recording by an examiner of the sequence of copying elements in a figure-copying test has been described in references 3, 4, 5 and 6.

In reference 6 is described a method whereby an examiner uses a plurality of colored pencils for recording the sequence of manipulation of figure elements by an examine.

References 5 and 6 describe a method whereby the process by which figure-copying tests are performed is recorded by the use of a plurality of colored pencils. Each time the examine copies an important element of a geometric pattern, the examiner gives the examine a different colored pencil. The order in which the important elements are copied is recorded for evaluation. The question as to which element is important is not specified. Moreover, as is clear to one skilled in the art, such a method interrupts the examine and reduces the validity of the results of such a test.

References 5 and 6 also describe a method, by which an examiner mirrors the process of copying a multi-element figure by an examine by copying what the examine copies simultaneously with the examine, and numbering the elements as they are drawn.

Since the pace of multi-element tests is fast and since manual notation is relatively time consuming, the recording methods described in the art fail to record all of the important information concerning the process by which a test is performed. Moreover, since the recording methods known in the art often fail to record a complete description of the process by which an examinee performs a test, it is not clear which part of the process should be given recording priority and how incomplete records are to be evaluated.

For example, in the art there exist more than eight different methods for evaluating the process of copying the Rey-Osterrieth Complex Figure, see references 3, 4, 5, 6, 7, 8, 9, 10 and 11. As known to psychologists, these evaluation methods are complicated and require considerable effort to master. Even when mastered, evaluation of the recorded results requires considerable time and skill. Once the data has been recorded, it can take in the range of 15 to 40 minutes to qualitatively score the test results, see reference 12. Consequently, the process by which an examinee performs a multi-element psychological test is rarely evaluated in a clinical setting, such as hospitals.

The above-mentioned inherent shortcomings of the prior art recording methods make it very difficult to use statistical methods for correlating performance of tests with cognitive abilities. Modem psychological testing theory stresses the advantages of using norms produced by quantitative and objective (i.e. statistical) methods rather than qualitative evaluation of the performance of a large group of examinees, see reference 13. In reference 14, the above shortcomings have been discussed in detail. Despite the increasing recognition of the need to analyze the process by which examinees perform multi-element tests, no method to prepare detailed, reliable and statistically analyzable records of such processes has been described due to the to the shortcomings of the prior art recordings methods.

Methods employing computer-based and multi-media methods for increasing the utility of psychological testing have been suggested. These methods relate to the scoring and evaluation of a test but do not provide a methodology for recording the observed process by which an examinee performs a multi-element task in an ecologically valid manner (reference 15), see for example, U.S. Pat. No. 5,961,332, U.S. Pat. No. 5,991,565 and U.S. Pat. No. 6,115,683.

Other methods have been suggested whereby an examinee actually performs a psychological test using a graphic interface (e.g. monitor) of a computer-based system, for example U.S. Pat. No. 5,211,564, U.S. Pat. No. 5,218,535, U.S. Pat. No. 5,326,270, U.S. Pat. No. 5,379,213, U.S. Pat No. 5,565,316 and U.S. Pat. No. 6,030,226. Although such testing methods have considerable merit for testing the general population, they are not adequate for psychological tests of cognitively impaired, computer illiterate or technologically illiterate populations. Indeed, in reference 15 it has been shown that tasks performed on a graphic interface of a computer-based system lack ecological validity, and do not reproduce the results obtained in a naturally performed task. Thus, computerized tests are qualitatively different and require preparation of dedicated sets of norms.

There is a need for a fast and efficient method for recording, in a complete and reliable manner, the process of performing a multi-element psychological test.

REFERENCES

1. Goldstein, K. "After effects of brain injury in war". (1942) New York: Grune and Stratton.
2. Werner, H. "Process and achievement: A basic problem of education and developmental psychology" *Harvard Educational Review*, 1937, 7, 353–368.

3. Binder, L. M. "Constructional strategies on complex figure drawings after unilateral brain damage" *Journal of Clinical Neuropsychology*, 1982, 4, 51–88.
4. Waber, D. P.; Holmes, J. M. "Assessing children's memory productions of the Rey-Osterrieth Complex Figure" *Journal of Clinical and Experimental Neuropsychology*, 1986, 8, 563–580.
5. Osterrieth, P. A. "Le test de copie d'une figure complexe: contribution a l'etude de la perception et de la memoire" *Archives de Psychologie*, 1944, 30, 206–356.
6. Rey, A. "L'examen psychologique dans les cas d'encephalopathie traumatique"*Archives de Psychologie*, 1941, 28, 286–340.
7. Visser, R. S. H. Manual of Complex Figure Test, (1973) Netherlands: Swets & Zeitlinger.
8. Bennet-Levy, J. "Determinants of performance on the Rey-Osterrieth Complex Figure Test: An analysis and a new technique for single case assessment" *British Journal of Clinical Psychology*, 1984, 23, 109–119.
9. Hamby, S. L.; Wilkins, J. W.; Barry, N. S. "Organizational quality on the Rey-Osterrieth and Taylor Complex Figure Tests: A new scoring system" *Psychological Assessment*, 1993, 5, 27–33.
10. Stem, R. A.; Singer E. A.; Duke, L. M.; Singer, N. G.; Morey, C. E.; Daughtrey, E. W.; Kaplan, E. "The Boston Qualitative Scoring System for the Rey-Osterrieth Complex Figure: Description and interrater reliability" *Clinical Neuropsychology*, 1995, 8, 309–322.
11. Bylsma, F. W.; Carison, M. C.; Schretlen, D.; Zonderman, A.; Resnick, S. "Rey-Osterrieth Complex Figure Test (CFT) Q-scores performance in 328 healthy adults ages 20 to 94*" Journal of the International Neuropsychological Society*, 1997, 3, 70.
12. Troyer, A. K.; Wishart, H. A. "A comparison of qualitative scoring systems for the Rey-Osterrieth Complex Figure Test", *Clinical Neuropsychologist*, 1997, 11, 381–390.
13. Pope, H. S. Butcher, J. N. and Seelen, J. The MMPI, MMPI-2, MMPI-A in Court: A practical guide for expert witness and attorneys, 2d Ed. (2000) Washington, D.C.: American Psychological Press.
14. Poreh, A. "The Quantified Process Approach—An emerging approach to neuropsychological assessment" *The Clinical Neuropsychologist*, 2000, 14, 1–11.
15. Sbordone, R. J. and Long, C. J. Ecological Validity of Neuropsychological Testing (1996) Delray Beach, Fla.: GR Press/St. Lucie Press.
16. Meyers, J. E.; Meyers, K. R. "Rey Complex figure under four different administration procedures" *The Clinical Neuropsychologist*, 1995, 9, 63–67.

SUMMARY OF THE INVENTION

The above and other objectives are achieved by the innovative recording method provided by the present invention.

The method of the present invention is based on the use of a graphic input device connected to a data storage device used by an observer for recording the observed performance of examinees on psychological tests. The method of the present invention is specifically formulated to be useful in recording the process by which an examinee performs a multi-element psychological test. The method can easily be configured to allow the observer to unobtrusively record the process.

According to the method of the present invention, the observer is presented, through the graphic input device, with a graphic representation of each one of the individual elements of a multi-element psychological test. The graphic input device is configured so that the graphic representation of each individual element is independently registerable by the observer using the graphic input device. When the observer sees the examinee perfonning an element of the test, the observer registers this event using the graphic input device. This registration is stored on a data storage device associated with the graphic input device in a way so that the order in which each element was perfonned and consequently registered is retrievable.

Hereinfurther, the term "multi-element psychological test" is understood to include, but is not limited to, amongst others: the performance of tasks involving the manipulation of a finite number of predetermined elements; the copying of complex geometric figures or designs; the physical manipulation (relocating, assembling, reassembling) of objects with a finite number of elements, e.g. jigsaw puzzles; and the reproduction, performance, recitation or recall from memory of a finite list of words or commands, read by an examiner to an examinee.

Herein, the word "element" is understood to be a generic term whose exact meaning is determined by the nature of the specific test being discussed. For example, element may refer to a line to be copied, a word to be recited, or a task to be performed. An element can be physical objects (e.g., blocks or puzzle pieces), graphic shapes (e.g., parts of a drawing), tasks, spoken words or commands. Thus an element is a specific, identifiable portion of a multi-element psychological test.

As used herein, the term "graphic interface device" means a device configured to (amongst other functions): a) display a graphic representation of an element of a multi-element test; b) allow a user to register each element individually with the help of a corresponding graphic representation; and c) supply, directly or indirectly, the fact of registration and the identity of an individual element registered to the data storage device.

As used herein, the term "graphic representation" means a written or pictorial representation of an element. As is clear to one skilled in the art, it is preferable that a given graphic representation be evocative of an element it represents and that the graphic representation be distinct from the graphic representations of other elements. It is clear to one skilled in the art that most preferable is that graphic representations be non-literal. Non-literal representations allow a single embodiment of the present invention to be used by a plurality of observers who do not share the same language. Further, as is well known to one skilled in the art, identification of a distinct non-literal (that is, pictorial) graphic representation is quicker then identification of a literal graphic representation.

A graphic input device suitable in implementing the method of the present invention includes devices such as a "touch-sensitive screen", a stylus-activated screen, and a graphic computer monitor coupled with a screen-pointing device (such as a computer mouse).

As stated hereinabove, in order to implement the present invention the graphic input device used is functionally associated with a data storage device. Any suitable data storage device that can be configured to communicate with a specific graphic input device can be used to implement the method of the present invention. However, according to a feature of the present invention, it is most advantageous to use a computer-based device such as a desktop computer, portable computer or a personal digital assistant (PDA). This allows, apart from simple manipulation and storage of collected data, immediate analysis and scoring of a given test. Apart from many obvious advantages, using a computer-based device also allows for the easy recording of the exact time when a specific event is performed in addition to the sequence.

It is not necessary that there be a physical connection between a graphic input device and a data storage device or between a data storage device and a device performing analysis and scoring according to the method of the present invention. It can be countenanced that an observer uses, for example, a PDA with a stylus-activated touch-sensitive screen to record the test-performing process and temporarily store these results. After the test is completed, the observer transmits the gathered results through wireless means to a remote analysis device that evaluates and scores the test, sending back the results of the evaluation to the PDA.

The fact that the process of the examinee performing the test is automatically recorded allows replaying of the process when desired. For example, if the psychological test is performed for use in a judicial process, replaying a recording of the process by which an examinee performed a test overcomes claims of lack of objectivity in interpretation of the results of a test.

Observation of an examinee by an observer includes direct real-time observation (e.g. the observer is in physical proximity of the examinee), remote real-time observation (e.g. the observer is not in physical proximity of the examinee and, concurrently with test performance, observes the examinee through a video device) and non-real time observation (e.g. the observer views a video recording of the examinee performing the test).

The method of the present invention allows an observer to record, accurately and completely, the process by which an examinee performs a multi-element psychological test in a format that allows quick, easy and reproducible analysis. An observer uses a device that includes a graphic input device to record the process of performing the test by the examinee. The graphic input device is coupled to a recording device which records, as a result of the use of the graphic input device by the observer, the order in which and the time when any given part of the test is performed.

In summary there is provided according to the teachings of the present invention a method for recording the process by which an examinee performs a psychological test, wherein the psychological test includes the stepwise manipulation of a finite number of distinct elements, by:
 a) using a graphic input device to display a graphic representation of each one of the finite number of elements of a multi-element test where associated with the graphic representation of an element a corresponding registerable area is delineated and configuring the graphic input device to register indication of a registerable area as selection of the element corresponding thereto;
 b) upon seeing a manipulation of a specific element by the examinee, an observer indicating the registerable area associated with the specific manipulated element; and
 c) recording the observer's indication of the registerable area on a data storage device operatively associated with the graphic input device.

It is important to clarify what is meant by association of the graphic representation and the registerable area, as stated immediately hereinabove. Most convenient is that the entire graphic representation of an element be delineated as a registerable area corresponding to that element. This is not necessary and depending on the implementation, a graphic representation can be larger or smaller than a corresponding registerable area, the shape of the graphic representation can be identical, similar or entirely different to that of the corresponding registerable area, and the area covered by the graphic representation can include, partially completely or not at all the corresponding registerable area. Only important is that an observer can, by seeing the graphic representation, quickly identify the corresponding registerable area in order to indicate the registerable area when so desired.

According to the teachings of the present invention, the method of the present invention there is provided a computer device to facilitate communication between the graphic input device and the data storage device.

Still further, according to the teachings of the present invention, there is provided a series of software commands, the software commands configured to, amongst other functions, to facilitate the display of the graphic representations and the use of the registerable delineated areas as described herein.

BRIEF DESCRIPTION OF THE DRAWINGS

The invention is herein described, by way of example only, with reference to the accompanying drawings, wherein:

FIG. 3A is a flowchart depicting a device used for implementing the present invention with a voice recognition device.

DESCRIPTION OF THE PREFERRED EMBODIMENTS

Figure 1A:
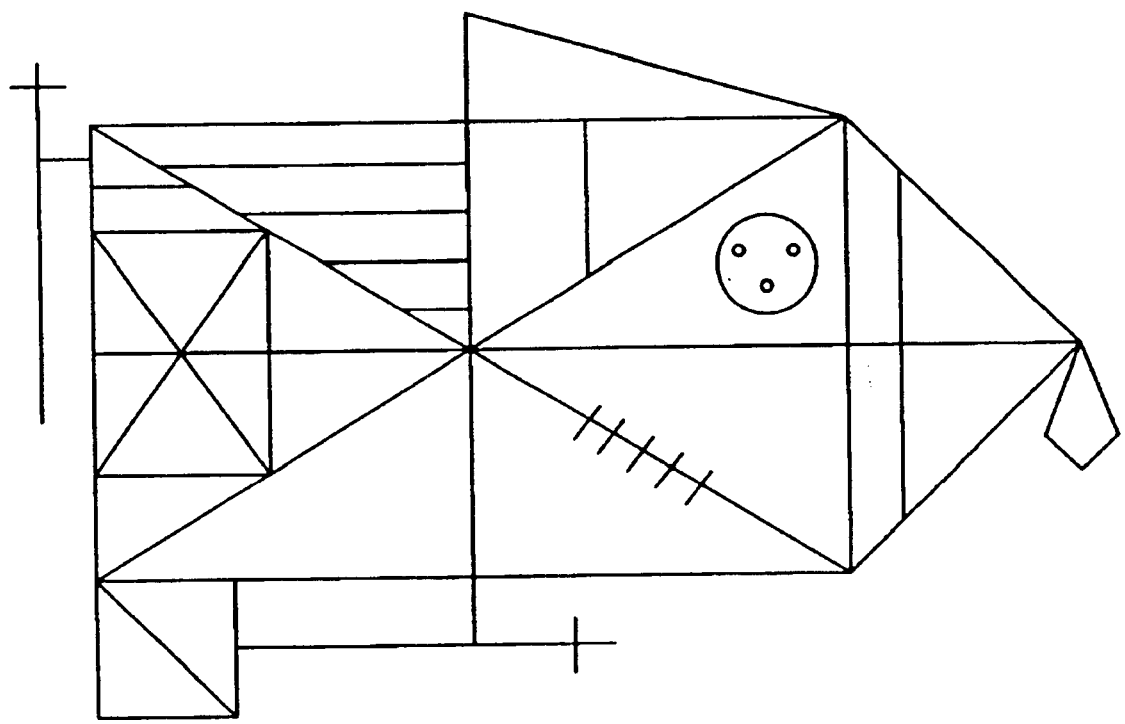
FIG. 1A (prior art) illustrates a Rey-Osterrieth Complex Figure used in psychological testing.

The present invention is a method that allows for the recording of the process by which an examinee performs a multi-element psychological test. The principles and use of the method of the present invention may be better understood with reference to the drawings, the accompanying description and illustrative embodiments.

In general the method of the present invention is used when an examinee performs a psychological test while an observer applies the method of the present invention to record the process by which the examinee performs the test. According to the method of the present invention, an examinee performs a psychological test in a usual way with whatever tools are appropriate so that the test retains its ecological validity.

When a test is completed, or when the time allocated for completing the test is up, a record describing the process by which the examinee performed the psychological test exists. The order and, in some cases the time, in which each separate step making up the test was performed is accurately recorded. Since the use of a graphic input device is quick, easy and intuitive, there is little examiner fatigue. As the data is directly stored in a storage device, analysis and scoring of the test can be swiftly and accurately performed without a time-consuming and error-prone data input step. Immediate data analysis or transmission is easily performed.

In general, there are two physical components necessary for the realization of the method of the present invention, a data storage device and a graphic input device.

The data storage device can be any appropriate device and the possible variations and options for a device are well known to one of average skill in the art. Magnetic media (hard disks, floppy disk), optical media (CD, DVD) or electronic media (RAM) are just illustrative examples of appropriate data storage devices.

The term "graphic interface device" as defined hereinabove indicates a device configured to display a graphic representation of the elements of the test, to allow a user to indicate the elements individually with the help of the graphic representation, and to supply the fact and identity of an individual element indicated to the data storage device. The term "graphic input device" includes a large number of various devices. For example, "touch-sensitive screens" (for example as manufactured by Elo TouchSystems (Fremont, Calif.)) are exceptionally suitable. Similarly suitable are stylus-activated screens (implemented, for example, in Palm® hand-held computer) which operate in a manner analogous to a touch-sensitive screen. Also suitable for implementation of the method of the present invention is a standard graphic computer monitor coupled, through a computer device, to a "pointing device" (e.g., mouse, wireless mouse, joystick, roller ball, touchpad, keyboard, keypad). Additionally, there exist various electromechanical or manually operated electrical devices that are suitable for use as a graphic input device according to the method of the present invention. Certain such devices include a physically printed figure as a graphic display. Registration is performed by closing an electrical circuit with the use of an electric plug to a contact, the contact being in proximity of a printed representation of the corresponding element.

Figure 1B:
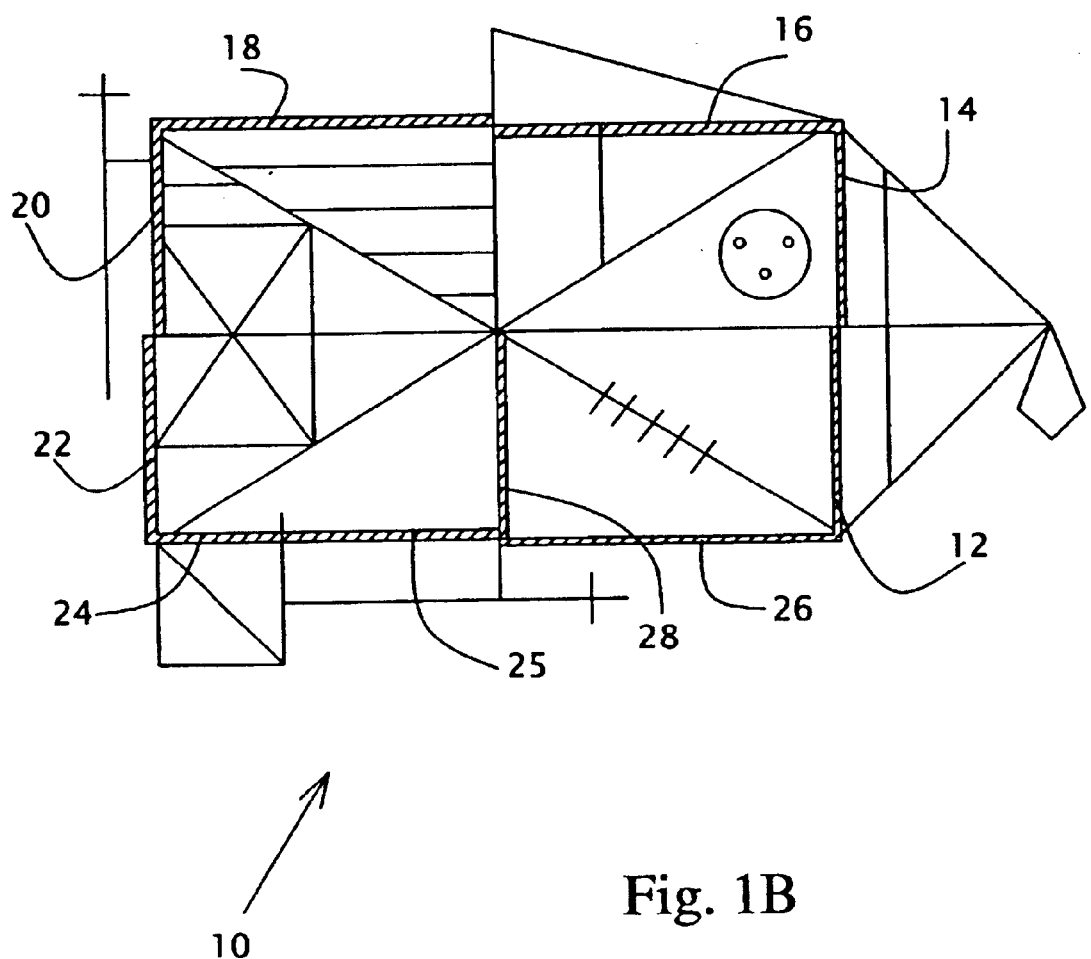
FIG. 1B is a depiction of a Rey-Osterrieth Complex Figure such as depicted in FIG. 1A, with ten elements emphasized.

In a first illustrative embodiment, the psychological test to be recorded involves copying the so-called Rey-Osterrieth Complex FIG. 10 depicted in FIG. 1A, see reference 16. An examinee is given a printed copy of complex FIG. 10, a blank piece of paper and a writing implement such as a sharpened pencil. Upon instruction of the observer, the examinee begins to copy complex FIG. 10 to the blank piece of paper. In FIG. 1B, a copy of complex FIG. 10 is depicted where ten individual elements 12, 14, 16, 18, 20, 22, 24, 25, 26 and 28 of the forty-eight distinct elements of complex FIG. 10 are emphasized and labeled.

Figure 1C:
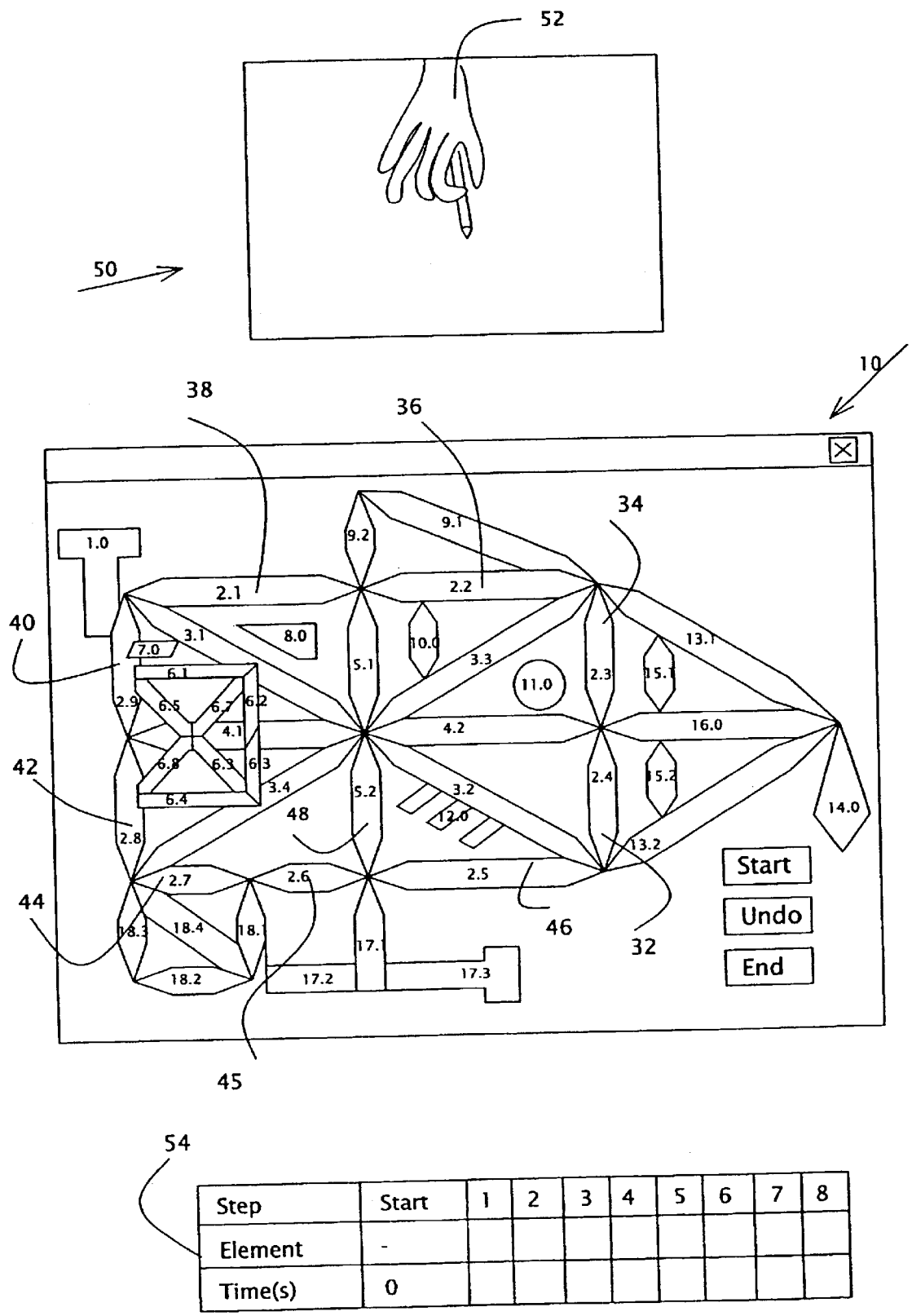
FIG. 1C is a depiction of a typical display of a graphic input device during performance of a test involving copying the complex figure depicted in FIG. 1A at the beginning of a test.

A touch sensitive screen coupled to a hard disk, as well as a computer and appropriate software, is used to display graphic representations of the individual elements of complex FIG. 10 to the observer, FIG. 1C. For example, individual elements 12, 14, 16, 18, 20, 22, 24, 25, 26 and 28 of complex FIG. 10 are represented in FIG. 1C by registerable graphic representations 32, 34, 36, 38, 40, 42, 44, 45, 46 and 48, respectively. Due to the shape and relative location of the different registerable graphic representations, the observer can easily identify which individual registerable graphic representation corresponds to which individual element of complex FIG. 10.

While the examinee copies complex FIG. 10, the observer records the process by which the examinee performs the test. The time at which the examinee begins the task is recorded on a data storage device, such as a hard disk. Every time the examinee begins copying one of the forty-eight elements of complex FIG. 10, the observer finds a corresponding registerable graphic representation of that element on the touch-sensitive screen and touches the registerable graphic representation with a finger. The touch-sensitive screen and associated hard disk are configured to record the time of the finger touch and the identity of the element represented by the registerable graphic representations touched.

If the examinee copies element 12 of complex FIG. 10, the observer touches the area delineated by registerable graphic representation 32. The touching of registerable graphic representation 32, and consequently of the fact that element 12 of complex FIG. 10 was copied, is recorded on the associated hard disk. Further, also the time when element 12 of complex FIG. 10 was copied is recorded. Although recording the time when a specific element of a multi-element task is not critical according to the present invention, it is clear to one skilled in the art that it is highly advantageous to record the time.

On the touch sensitive screen depicted in FIG. 1C is also displayed a real-time video display 50 of a hand 52 of an examinee copying complex FIG. 10 as well as a listing 54 of the individual tasks already performed. As can be seen from both listing 54 and video display 50, FIG. 1C depicts an instant in time when an examinee has just begun the test and not yet copied any element of complex FIG. 10.

Figure 1D:
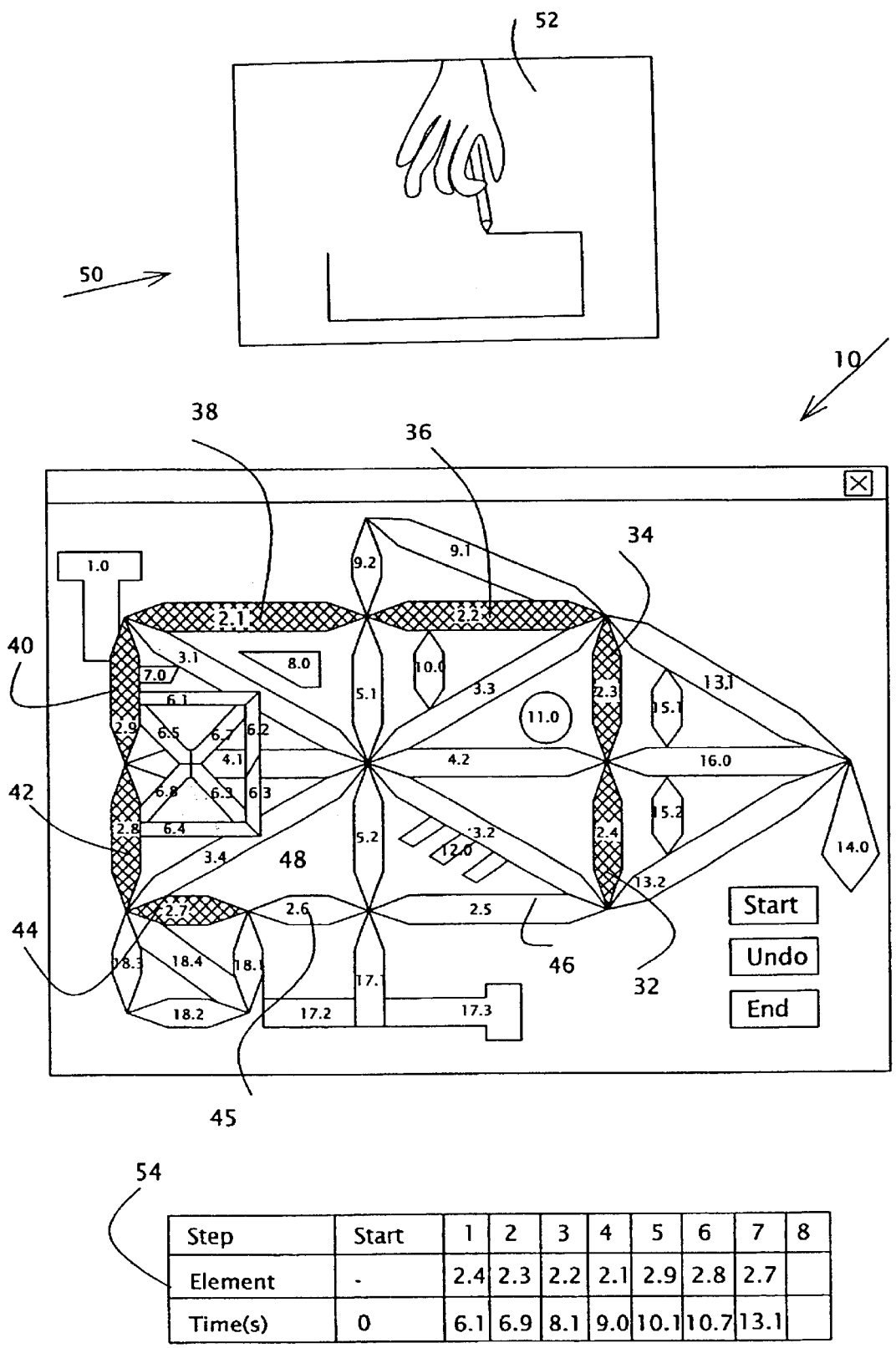
FIG. 1D is a depiction of a typical display of a graphic input device during performance of a test involving copying the complex figure depicted in FIG. 1A after seven elements have been copied.

FIG. 1D depicts the touch sensitive screen of FIG. 1C at roughly 13.1 seconds after the beginning of the test. In video display 50 of FIG. 1D, it is seen that seven elements of complex FIG. 10 have been copied, specifically elements 12, 14, 16, 18, 20, 22 and 24.

In listing 54 of FIG. 1D it is seen that the identity of the copied elements as well as the time, to the accuracy of tenths of seconds, when an element was copied is listed. It is clear that the identity of the copied element and the time the element was copied are also stored for future reference on the data storage device. Although not necessary, a listing, such as 54, may be useful for an observer. The order in which the separate tasks of the test have been performed is recorded on a storage device whether a listing such as 54 is displayed or not.

In the first embodiment of the present invention as depicted in FIGS. 1C and 1D, once a registerable graphic representation of an element of a multi-element test is touched and this fact is recorded on the associated data storage device, the appearance of that registerable graphic representation is changed.

As is seen in FIG. 1D, registerable graphic representations 32, 34, 36, 38, 40, 42 and 44, corresponding to already copied elements 12, 14, 16, 18, 20, 22 and 24 respectively, appear in a lighter color then the registerable graphic representations, such as 46 and 48, corresponding to not yet copied elements, 26 and 28, respectively.

Figure 2A:
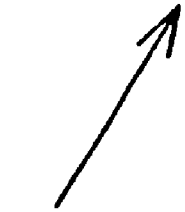
FIG. 2A shows a nine-word list that is to be read out loud and thereafter recalled by an examinee in the framework of a psychological test.

In a second embodiment of the present invention, the psychological test to be recorded involves remembering a list 56 of nine words, FIG. 2A. The observer instructs the examinee to try to remember the nine words, and then reads the nine words, one after the other to the examinee. Thereafter, the examinee recalls, out loud, the nine words to the best of his or her ability.

In the second embodiment of the present invention the observer uses a graphic monitor with a functionally associated computer mouse connected through a personal computer as a graphic input device. The hard disk of the personal computer functions as a recording device.

Figure 2B:
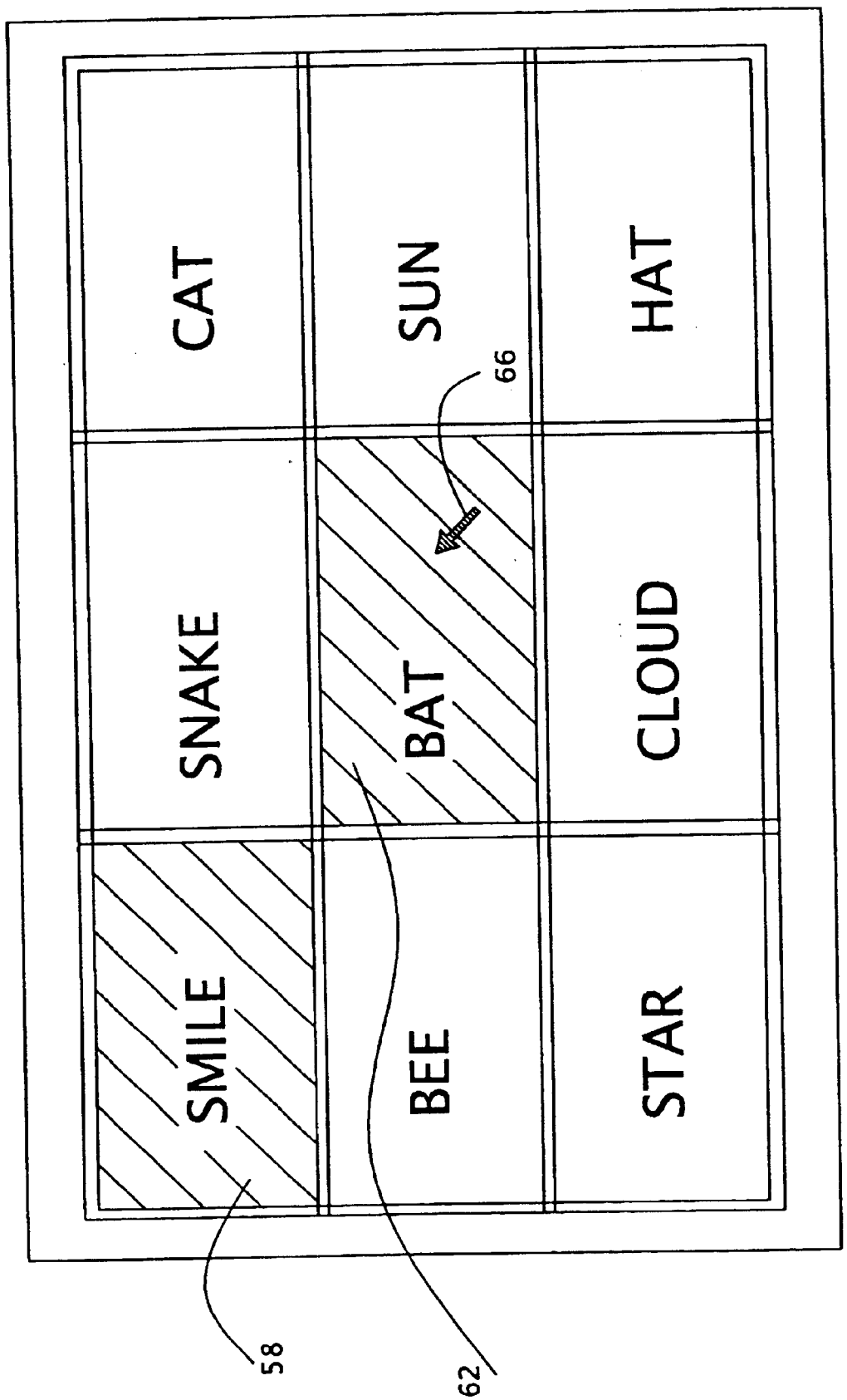
FIG. 2B is a depiction of the word list of FIG. 2A as appears on a typical graphic input device according to the method of the present invention where the graphic representation of each word is literal.
Figure 2C:
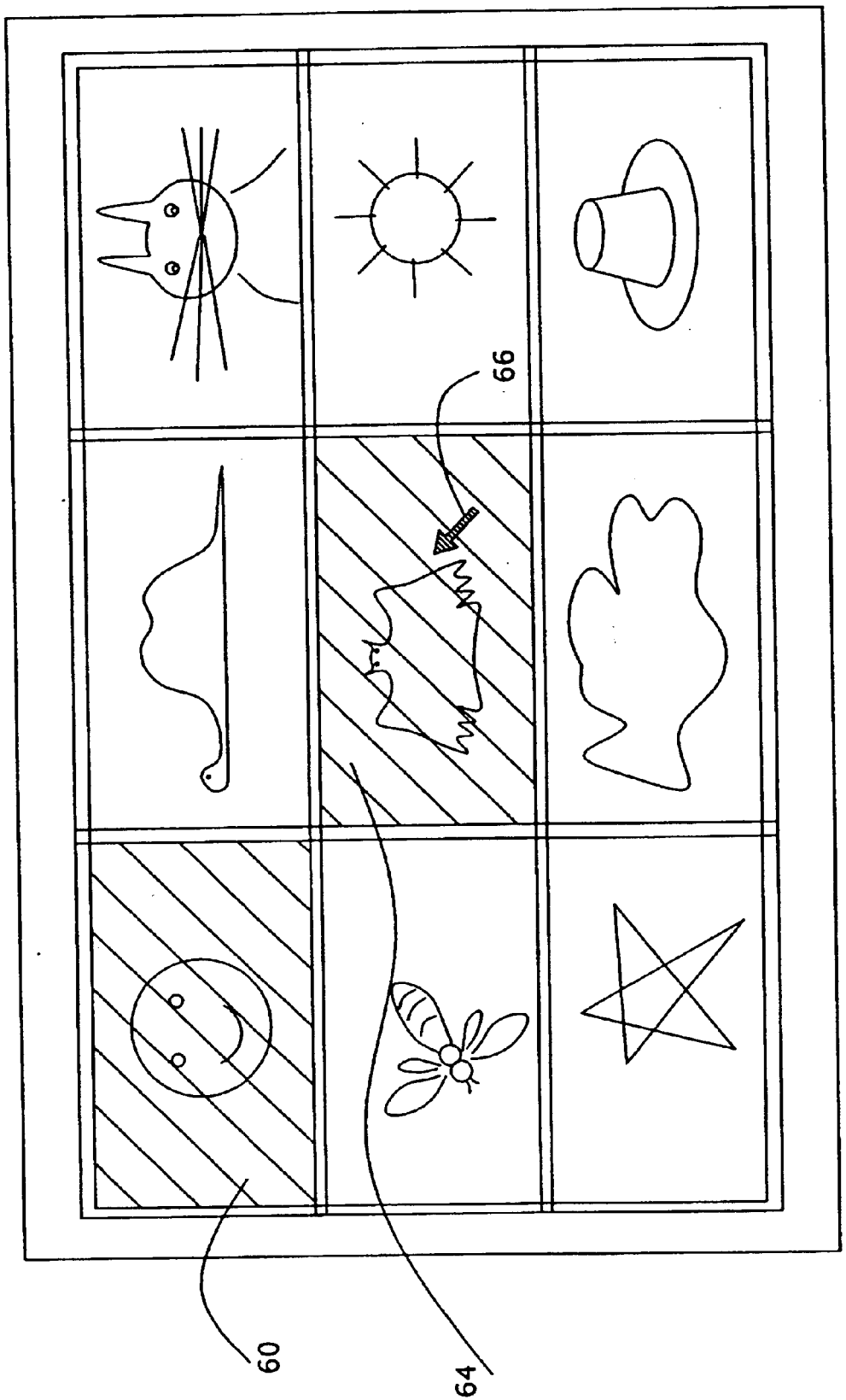
FIG. 2C is a depiction of the word list of FIG. 2A as appears on a typical graphic input device according to the method of the present invention where the graphic representation of each word is non-literal.

On the graphic monitor are displayed a graphic representation of each one of nine words from list 56. In FIG. 2B, the graphic representations are delineated boxes surrounding literal representations of the words of list 56 in English. In FIG. 2C, the graphic representations are delineated boxes surrounding graphic representations of the words of list 56. For example, the graphic representation of the word "smile" is box 58 in FIG. 2B and is box 60 in FIG. 2C. Similarly, the graphic representation of the word "bat" is box 62 in FIG. 2B and is box 64 in FIG. 2C.

Due to the shape and relative location of the different registerable graphic representations, an observer can easily identify which individual graphic representation corresponds to which individual word from list 56. As is clear to one skilled in the art, the graphic representations of FIG. 2C, such as 60 and 64 are preferable over the graphic representations of FIG. 2B, such as 58 and 62. The embodiment depicted in FIG. 2C is multilingual, quicker and more intuitive to use than the embodiment depicted in FIG. 2B.

As an examinee proceeds to recite words from list 56, the observer hears the word said, and uses the method of the present to record the order in which the examinee recites the words according to the method of the present invention. The time at which the examinee begins the task is recorded on the hard disk. Every time the examinee recites one of the words from list 56, the observer with the help of the associated computer mouse, uses the well known "touch and click" method to bring a cursor 66 to the corresponding registerable graphic representation on the graphic monitor, and stores the fact that a word was stated on the hard disk. For example, if the examinee recites "bat", the observer brings mouse cursor 66 to box 64 and "clicks" using the computer mouse. The "clicking" of box 64, and consequently the fact and time that the word "bat" was recited by the examinee, is recorded on the data storage device.

One skilled in the art is well acquainted with the method whereby a cursor 66 is "pointed" with the help of a computer mouse to within an area delineated on a display monitor, and how "clicking" causes registration by an associated personal computer.

In the second embodiment of the present invention, once a registerable graphic representation is registered and this fact is recorded on an associated hard disk, the appearance of the registerable graphic representation is changed.

FIGS. 2B and 2C represent a moment in time during a test where "bat" and "smile" have been recited by the examinee, as evidenced by the shading of registerable graphic representations 62 and 64, corresponding to the word "bat" and 58 and 60, corresponding to the word "smile".

It is important to note that in a test where the examinee is asked to recite a list, such as described in the second embodiment of the present invention, the fact that words are recited repeatedly can be registered and stored. Thus, in general, application of the method of the present invention allows for many useful and heretofore difficult to implement psychological tests to be formulated and applied. Needless to say, analysis of these tests can easily be performed due to the natural affinity of the method of the present invention to computer-based devices.

A variation of the second embodiment of the present invention includes the use of automated voice-recognition methods to assist in recording the process of performing the test. In this variation a device 67, schematically depicted in FIG. 3A is used. In FIG. 3A, device 67 is made up of a microphone 68, voice analysis device 70, computer 72 with hard disk 74, computer mouse 76 and graphic monitor 78. On graphic monitor 78 is displayed an image 80, similar to that depicted in FIG. 2C.

Figure 3B:
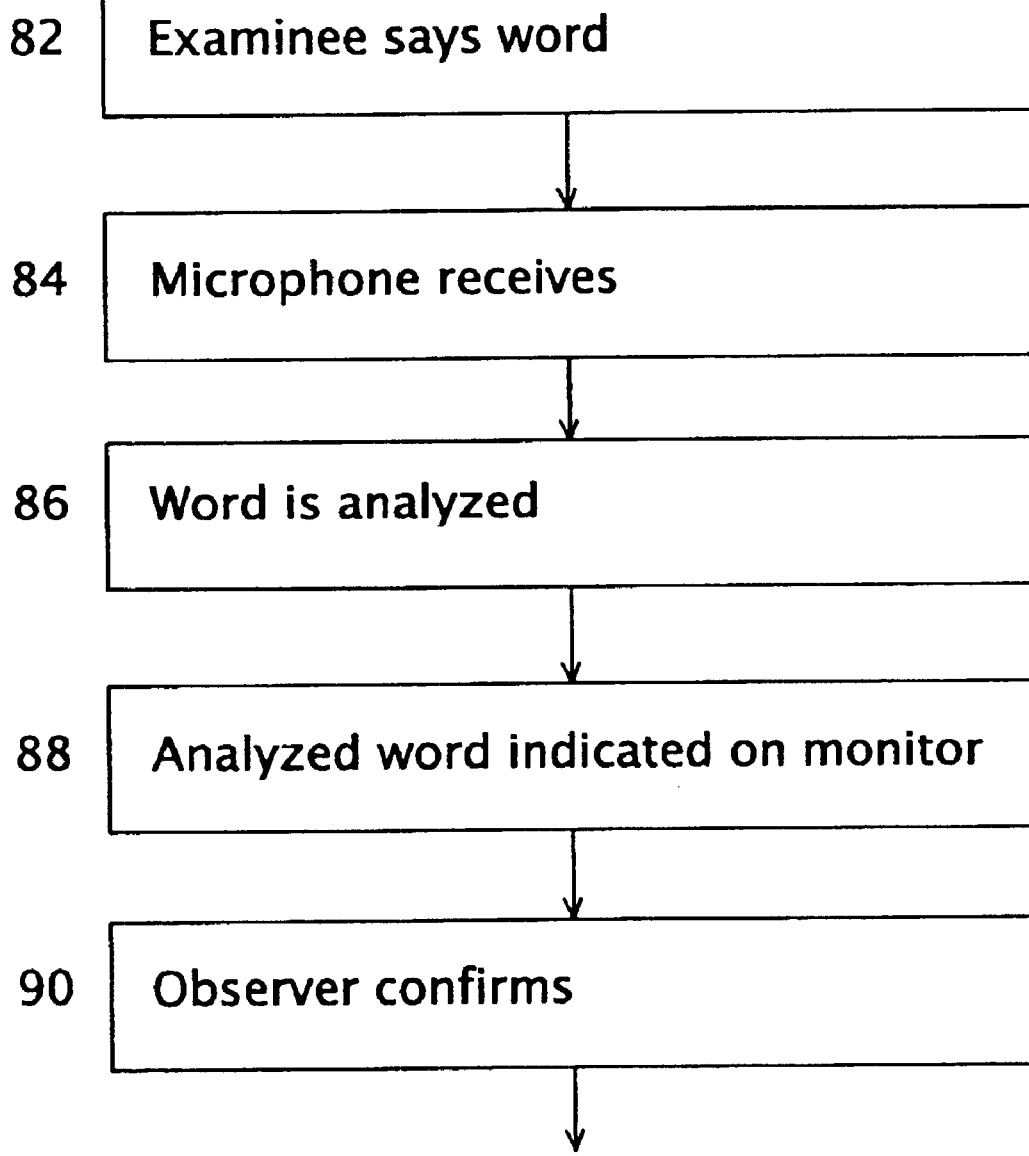
FIG. 3B is a flowchart depicting the use of the present invention coupled with a voice-recognition device.

Operation of the variation of the second embodiment of the present invention using device 67 is depicted in flowchart 81, FIG. 3B. Every word that an examinee recites during a testing process, step 82, is received as a signal by microphone 68, step 84. The received signal is transmitted to voice analysis device 70 that analyzes the signal to identify what word was said, step 86. The identity of the word is transferred to computer 72 and indicated on graphic monitor 78 by varying the appropriate graphic representation of the word said in image 80, step 88. The observer either confirms that the word identified by device 67 is correct or corrects an incorrect identification using computer mouse 76, in the usual way.

The use of the present invention allows for recording all salient information concerning performance of a test in a format appropriate for analysis. Unlike with methods described in the prior art, the format and content of the data is easily standardized even when applied by different observers found in disparate locations. The data is easily transferred to a device such as a computer that can be configured to automatically analyze the data of an individual test or correlate the results of a large number of tests.

As is clear to one skilled in the art, application of the method of the present invention makes available heretofore-unknown vistas of psychological testing. Once a sufficient mass of data is gathered using the method of the present invention is patterns of test performance shall be correlated with certain psychological profiles. As a result, the method of the present invention increases the utility of existing psychological tests.

While the invention has been described with respect to a limited number of embodiments, it will be appreciated that many variations, modifications and other applications may be made without exceeding the spirit and scope of the present invention.

What is claimed is:

1. A method for recording the process by which an examinee performs a psychological test, wherein the psychological test includes the stepwise manipulation of a finite number of distinct elements, by:

a) with a graphic input device, displaying a graphic representation of each one of the distinct elements of the psychological test where associated with a said graphic representation of a said distinct element is delineated a corresponding registerable area and wherein said graphic input device is configured to register indication of a registerable area as selection of the distinct element corresponding thereto;

b) upon identifying a manipulation of a specific element by the examinee, an observer indicating a registerable area associated with said specific manipulated element; and c) recording said indication by said observer of said registerable area on a data storage device operatively associated with said graphic input device.

2. The method of claim 1 wherein said data storage device is further configured to store a time-dependent value for each said indication.

3. The method of claim 1 wherein after said recording of said indication of said delineated area associated with said specific manipulated element, changing an appearance of a corresponding graphic representation.

4. The method of claim 1 further comprising providing a computer device, said computer configured to facilitate communication between said graphic input device and said data storage device.

5. The method of claim 1 further comprising a series of software commands, said software commands configured to facilitate said display of said graphic representations.

6. The method of claim 1 wherein said graphic representations are graphic forms.

7. The method of claim 1 wherein said graphic representations are graphic representations of the individual elements of a complex figure.

8. The method of claim 1 wherein said graphic representations are alphabetic representations of words.

9. The method of claim 1 wherein said graphic representations are pictorial representations of words.

10. The method of claim 1 wherein said graphic input device is a touch-sensitive screen and wherein said indication is performed by touching a said delineated area on an input surface of said touch-sensitive screen.

11. The method of claim 1 wherein said graphic input device is a stylus activated screen and wherein said indication is performed by touching with a stylus a said delineated area on an input surface of said stylus activated screen.

12. The method of claim 1 wherein said graphic input device is a graphic display monitor and an associated pointing device and wherein said indication is performed by indicating a delineated area of said graphic display monitor with the help of said pointing device.

13. The method of claim 1 wherein said pointing device is a device selected from a group including: a computer mouse, a wireless mouse, a joystick, a roller ball, a touch pad, a key pad, a number pad and a keyboard.

14. The method of claim 1 wherein said identifying a manipulation of a specific element by the examinee, includes viewing a recording of the examinee performing the test by said observer.

15. The method of claim 1 wherein said identifying a manipulation of a specific distinct element by the examinee, includes viewing the examinee performing the test by said observer as the examinee performs the test.

16. The method of claim 1 wherein said identifying a manipulation of a specific element by the examinee includes hearing the examinee recite a word from memory.

17. The method of claim 1 wherein a distinct element is a word and wherein said identifying a manipulation of a distinct element by the examinee includes:

i. tentative identification of a word recited from memory by the examinee by an automatic voice recognition device;

ii. changing an appearance of a graphic representation corresponding to a word identified tentatively as said recited word;

iii. if said graphic representation corresponds to said recited word, confirmation of said tentative identification by said observer.

* * * * *

UNITED STATES PATENT AND TRADEMARK OFFICE
CERTIFICATE OF CORRECTION

PATENT NO. : 6,629,846 B2
DATED : October 7, 2003
INVENTOR(S) : Poreh

It is certified that error appears in the above-identified patent and that said Letters Patent is hereby corrected as shown below:

Title page,
Insert Item -- [60]     Related U.S. Application Data
        Provisional Application no, 60/272,582 filed on March 1, 2001 --

Signed and Sealed this

Twenty-second Day of March, 2005

JON W. DUDAS
*Director of the United States Patent and Trademark Office*